(12) United States Patent
Upton et al.

(10) Patent No.: US 8,887,687 B2
(45) Date of Patent: Nov. 18, 2014

(54) HEAT SHIELD HAVING LOCATING AND RETENTION FEATURES

(75) Inventors: Kenneth Upton, Reinholds, PA (US); John Burdy, Morgantown, PA (US)

(73) Assignee: Federal-Mogul Worldwide, Inc., Southfield, MI (US)

( * ) Notice: Subject to any disclaimer, the term of this patent is extended or adjusted under 35 U.S.C. 154(b) by 0 days.

(21) Appl. No.: 13/469,658

(22) Filed: May 11, 2012

(65) Prior Publication Data

US 2012/0222283 A1 Sep. 6, 2012

Related U.S. Application Data

(62) Division of application No. 11/619,736, filed on Jan. 4, 2007, now Pat. No. 8,186,325.

(60) Provisional application No. 60/756,521, filed on Jan. 5, 2006.

(51) Int. Cl.
*F02B 77/00* (2006.01)
*F01N 13/14* (2010.01)
*F02B 77/11* (2006.01)
*B60R 13/08* (2006.01)

(52) U.S. Cl.
CPC .......... *F01N 13/148* (2013.01); *F01N 2260/20* (2013.01); *F01N 2560/02* (2013.01); *F02B 77/11* (2013.01); *F01N 13/14* (2013.01); *F01N 2560/00* (2013.01); *B60R 13/0869* (2013.01)
USPC ........ 123/195 C; 29/428; 180/309; 174/16.3; 123/195 R

(58) Field of Classification Search
CPC ... B60R 13/0869; F01N 13/148; F02B 77/11; F23M 5/04; F23M 2900/05002; F23M 2900/05004
USPC .................. 123/195 R, 195 A, 195 E, 198 R; 29/888.01, 889.721, 890.03, 890.045, 29/890.032, 429, 527.1; 60/298; 180/309, 180/89.2; 165/41; 361/704; 174/16.3
See application file for complete search history.

(56) References Cited

U.S. PATENT DOCUMENTS

| | | | |
|---|---|---|---|
| 2,809,004 A | 10/1957 | Kaufman at al | |
| 2,909,354 A | 10/1959 | Bingham | |
| 3,160,280 A | 12/1964 | Burch | |
| 3,237,716 A | 3/1966 | Parsons | |
| 4,085,816 A | 4/1978 | Amagai et al. | |
| 4,895,268 A * | 1/1990 | Hyde | 220/694 |
| 5,233,953 A | 8/1993 | Whitehurst et al. | |
| 5,381,041 A * | 1/1995 | Harmon | 257/718 |

(Continued)

FOREIGN PATENT DOCUMENTS

EP 0751044 1/1997

*Primary Examiner* — Noah Kamen
*Assistant Examiner* — Long T Tran
(74) *Attorney, Agent, or Firm* — Robert L. Stearns; Dickinson Wright, PLLC

(57) ABSTRACT

A heat shield assembly includes shroud or housing fabricated from a heat shielding material having at least one pair of spring arms extending from side walls of the shroud for engaging a member to which the heat shield assembly is to be attached, and one or more retention tabs projecting into a longitudinal channel in position to limit longitudinal movement of the assembly relative to the member when the member is attached to the spring arms.

1 Claim, 3 Drawing Sheets

(56) References Cited

U.S. PATENT DOCUMENTS

| | | | |
|---|---|---|---|
| 5,505,031 A * | 4/1996 | Heydon ........................ 52/281 |
| 5,576,933 A | 11/1996 | Campanella et al. |
| 5,603,297 A | 2/1997 | Wolf et al. |
| 5,611,393 A * | 3/1997 | Vasconcelos et al. ....... 165/80.3 |
| 5,649,510 A | 7/1997 | Linze |
| 5,831,357 A | 11/1998 | Stohler et al. |
| 5,844,177 A | 12/1998 | Pirchi |
| 6,097,603 A * | 8/2000 | Edwards et al. .............. 361/719 |
| 6,104,612 A * | 8/2000 | Holland ........................ 361/704 |
| 6,262,893 B1 * | 7/2001 | Liu ................................ 361/704 |
| 6,401,807 B1 * | 6/2002 | Wyler et al. .................... 165/121 |
| 6,415,609 B1 * | 7/2002 | Vacek et al. .................... 60/761 |
| 6,438,949 B1 | 8/2002 | Nozaki |
| 6,595,801 B1 * | 7/2003 | Leonard et al. .......... 439/607.55 |
| 6,729,905 B1 * | 5/2004 | Hwang .................... 439/607.21 |
| 2003/0064644 A1 * | 4/2003 | Nakajima .................... 440/89 J |
| 2003/0213208 A1 | 11/2003 | Belanger |

\* cited by examiner

HEAT SHIELD HAVING LOCATING AND RETENTION FEATURES

This divisional application claims priority to U.S. Utility application Ser. No. 11/619736, filed Jan. 4, 2007 now U.S Pat. No. 8,186,325 and U.S. Provisional Application 60/756521, filed Jan. 5, 2006, both of which are incorporated herein by reference.

BACKGROUND OF THE INVENTION

1. Field of the Invention

The invention relates generally to heat shields and more particularly to systems and methods for attaching heat shields to a member to be shielded.

2. Description of Related Art

Engines in high performance modern vehicles operate at very high temperatures. Certain components of the engine are prone to generating significant heat, such as the exhaust manifold and associated exhaust piping system, the engine block, etc. The excessive heat can be harmful to some neighboring components if left unprotected. It is common to employ various heat shields in under-the-hood applications as a means of shielding such neighboring components from direct exposure to the damaging heat. Various techniques are employed for attaching the heat shield in a desired position to be effective. One such approach employs spring clips that enable the heat shield to be pushed into engagement with a member to be shielded. Such spring dips have limitations in that, depending on their configuration, they can be unidirectional so as to secure the heat shield against removal in the reverse direction of installation, while enabling movement of the heat shield in other directions relative to the member to which they are attached.

SUMMARY OF THE INVENTION

A heat shield assembly constructed according to one aspect of the invention comprises a shroud or housing of heat shielding material, at least one pair of spring arms extending from side walls of the shroud for engaging a member to which the heat shield assembly is to be attached, and one or more retention tabs projecting into the longitudinal channel in position to limit longitudinal movement of the assembly relative to the member when the member is attached to the spring arms. The spring arms are attached to the member in a manner that permits the member to slide relative to the shroud in a longitudinal direction toward an open end of the longitudinal channel. The retention tabs are arranged to engage the member when it is slid to prevent it from sliding out of engagement with the spring arms and/or sliding out through the open end of the shroud.

According to a further aspect of the invention, the assembly may also include an inner frame that supports an outer heat shielding layer and the retention tab and spring arms may be formed as part of the frame structure.

The invention further contemplates a method of mounting a heat shield assembly to a member to be shielded that includes preparing the heat shield assembly having a channel-shaped shroud of heat shielding material with a pair of spring arms provided on side walls thereof and having at least one retention tab projecting into the channel, and then attaching the heat shield assembly to the member by extending the member into the longitudinal channel in a direction transverse to a longitudinal direction of the heat shield to engage the spring arms with the member thereby securing the shield against inadvertent removal in the reverse direction of installation, while permitting the member to slide relative to the spring arms toward an at least one open end of the channel, and limiting longitudinal movement of the member relative to the spring arms by locating the at least one retention tab in the path of the member to limit longitudinal movement of the member relative to the spring arms. The retention tabs thus present a barrier to free sliding movement of the member within the channel to prevent the member from sliding out of engagement with the spring arms and/or out of the open end of the channel.

BRIEF DESCRIPTION OF THE DRAWINGS

Advantages of the present invention will become more readily appreciated when considered in connection with the following detailed description and appended drawings, wherein.

DETAILED DESCRIPTION OF THE EXEMPLARY EMBODIMENT

Figure 1:
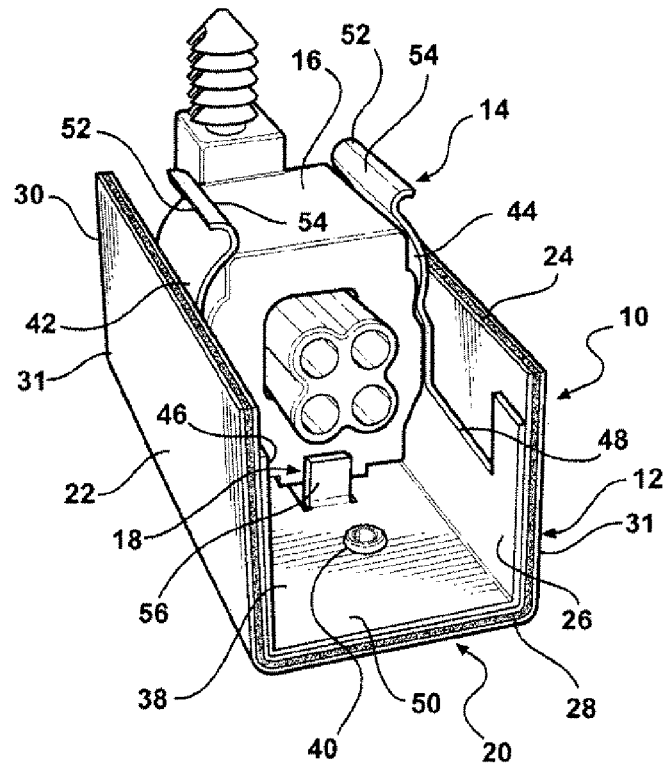
FIG. 1 is a front view from the longitudinal end of a heat shield assembly attached to a member according to the exemplary embodiment of the invention.
Figure 2:
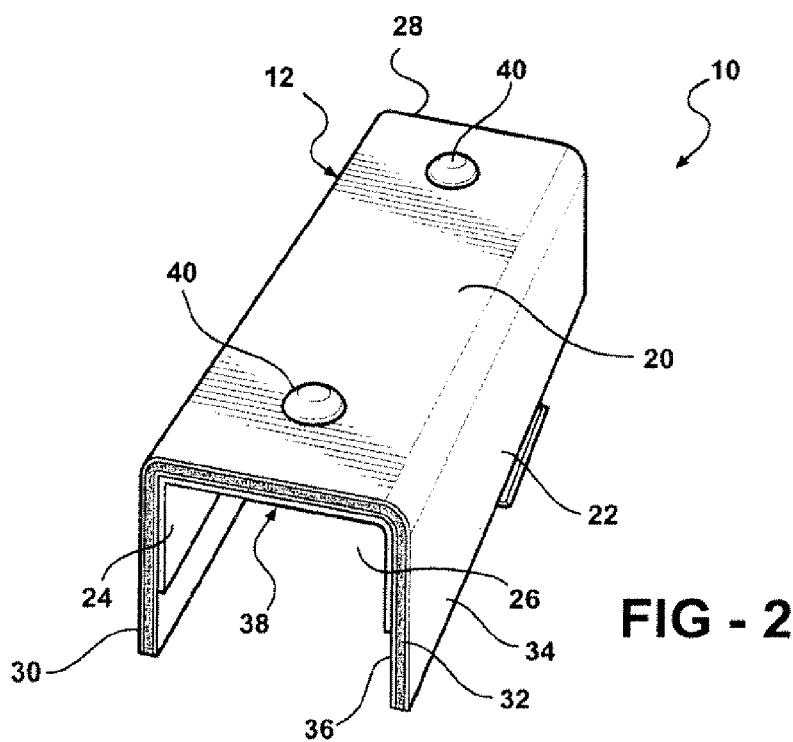
FIG. 2 is a plan view of a heat shield assembly according to the exemplary embodiment of the invention.

Referring to FIGS. 1 and 2, a heat shield assembly 10 according to a presently preferred embodiment of the invention includes a heat shield body or shroud 12, an attachment device 14 carried on the shroud 12 and operative for releasably securing the heat shield assembly to a member 16 to be protected by the heat shield assembly 10, and supplemental retention members 18 carried on the body in spaced relation to the attachment device 14 and operative to locate and selectively engage the member 16 to position and retain the heat shield assembly 10 on the member 16 in cooperation with the attachment device 14.

The shroud 12 may include a base 20 and at least two sides 22, 24. The sides 22, 24 extend from the base 20 in spaced apart relation to one another to define a space 26 into which the member 16 can be disposed for shielding the member 16 from exposure to heat external to the heat shield assembly 10. The heat shield assembly 10 is thus operative to cover and protect the member 16 from exposure to one or more sources of heat that could otherwise act to harm the member 16. For example, the heat shield assembly 10 can serve to reflect radiant heat and/or block the transfer of conductive heat to the member 16.

The shroud 12 in the illustrated embodiment is generally channel-shaped, with the base 20 forming a base wall of the channel and the two sides 22, 24 forming the side walls of the channel. Opposite longitudinal ends 28, 30 of the shroud 12 may be open to the space 26 such that the shroud 12 is generally U-shaped when viewed from a longitudinal end of the heat shield assembly 10.

The shroud 12 may be made of any of a number of heat shielding materials that would be effective to shield the member 16 from heat and may be rigid or flexible. One suitable construction includes a multilayer heat shielding material 31 having a substantially nonconductive insulating layer 32 of nonwoven polyester felt or glass fiber mat sandwiched between outer and inner layers 34, 36 of a reflective metal foil such as aluminum. This multilayer heat shielding material 31 may further include a relatively rigid inner support frame 38 about which the multilayer heat shielding material 31 may be draped to impart a self-supporting shape to the shroud 12. In the illustrated embodiment, the frame 38 has a generally U-shaped channel configuration and the multilayer heat shielding material 31 may be permanently secured to the frame 38 by any suitable means, such as rivets 40 in the base 20 of the shroud 12. The material 31 could also be secured to the frame 38 by a suitable adhesive or other mechanical fastening means.

Figure 3:
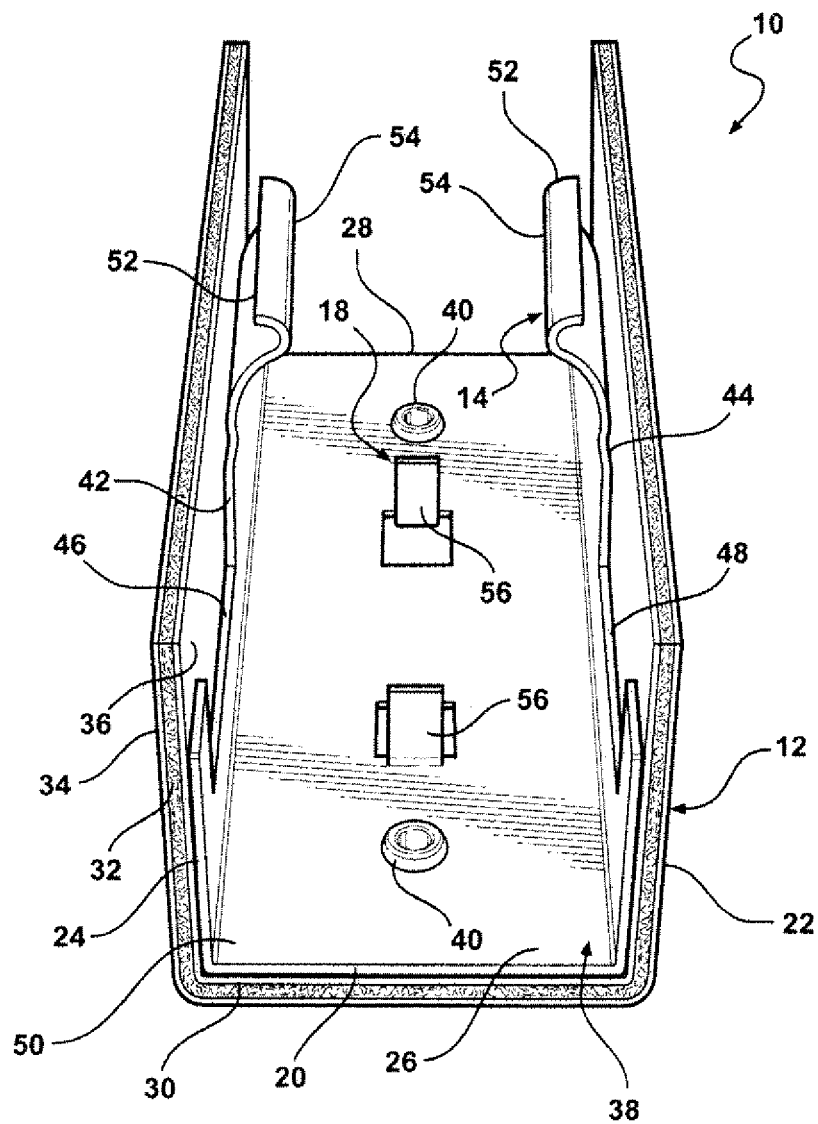
FIG. 3 is plan view of the inside of a heat shield assembly according to the exemplary embodiment of the invention.
Figure 4:
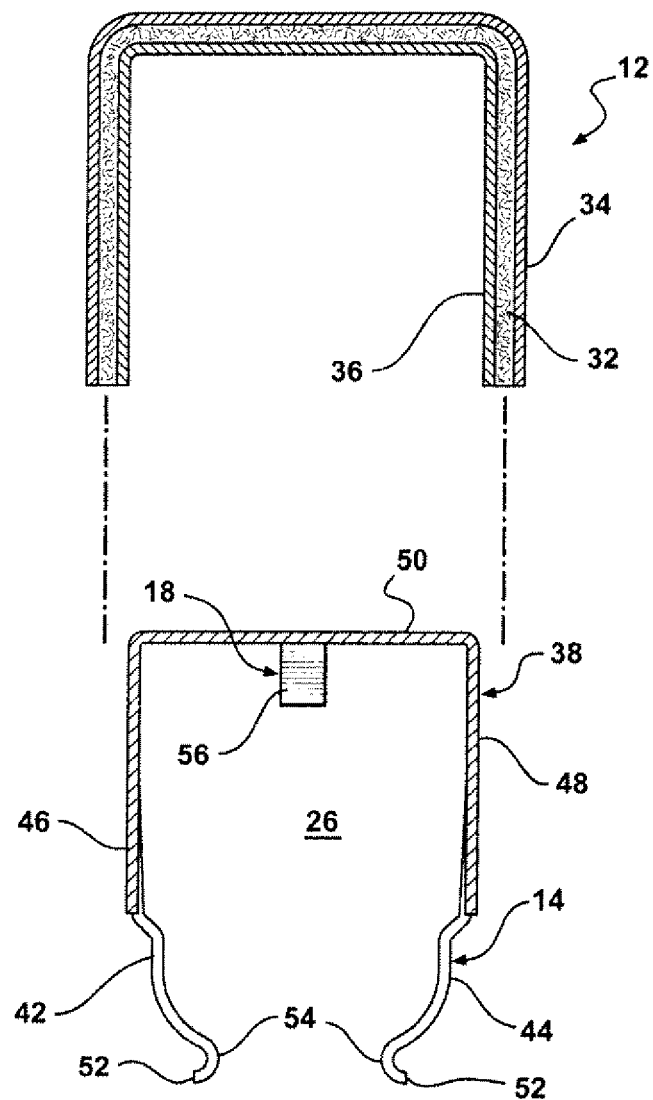
FIG. 4 is a schematic view of the heat shield assembly according to the exemplary embodiment of the invention.

Referring to FIGS. 2 and 3, the frame 38 operates in the illustrated embodiment to give the desired shape to the shroud 12. The frame 38 may also include attachment device features 14 as well as the retention members 18. The attachment device features may comprise snap-lock connectors that operate to secure the heat shield assembly 10 to the member 16 in response to forcing the assembly 10 into assembled engagement with the member 16. The snap-lock connectors include a pair of opposing resilient spring arms 42, 44 carried on the sides 22, 24 of the shroud 12. The spring arms 42, 44 are preferably formed as part of the frame 38 and may best be formed by shaping and bending side wall portions 46, 48 of the frame 38 into the shape of the spring arms 42, 44. For this purpose, the frame 38 may be made in part or entirely of a suitably resilient material such as spring steel or the like. Suitable plastics materials are also contemplated by the invention. As illustrated, the spring arms 42, 44 extend in the same direction from a base 50 of the frame 38 toward free ends 52 on laterally opposite sides of the shroud 12. The arms 42, 44 are spaced from one another and may be inwardly contoured, such as by bending the material, adjacent their free ends 52 to form narrowed catch portions 54 of the arms 42, 44. These catch portions 54 engage the body of the member 16, which may comprise, for example, an electronic sensor. The arms 42, 44 may further extend width-wise in the longitudinal direction of the shroud 12 toward the open ends 28, 30 of the shroud 12.

The base 50 of the frame 38 may carry the retention members 18. The retention members 18 may project from the base 50 inwardly of the space 26 in the general direction of the free ends 52 of the spring arms 42, 44. The retention members may comprise two or more tab portions 56 that are spaced from one another in the longitudinal direction of the shroud 12. The spacing of the tab portions 56 is sufficient to accommodate a portion of the member 16 when the member 16 is positioned in the space 26 of the shroud 16 to thereby positively locate the member 16 relative the shroud 12. The tab portions 56 are spaced longitudinally from the open ends 28, 30 of the shroud 12 and are provided to limit the longitudinal movement of the member 16 within the space 26 to within the region defined between the tab portions 56, The tab portions 56 may be formed integrally with the frame 38 by cutting U-shaped slots in the base 50 and then bending the resultant tab portions 56 out of the plane of the base 50 so that they project into the space 26 in generally parallel relation to one another.

In operation, the member 16, such as a sensor, is protected from exposure to heat by positioning the heat shield assembly 10 over the member 16 and then guiding the assembly with force causing the arms 42, 44 to widen and push through the catch portions 54 of the spring arms 42, 44 as they deflect outwardly. The member 16 is guided into position past the catch portions 54 which return inwardly to capture the member 16 against removal in the installation direction. The member 16 is further captured between the retention tabs 56. In this way, the spring arms secure the heat shield assembly 10 releasably on the member in the direction of installation, while the retention tabs 56 contain the member 16 from moving out of the channel through the open ends 28, 30 of the shroud 12. Of course, the retention tabs 56 could also be used in conjunction with a shroud whose ends were not open (e.g., ends which may be covered by additional sides of the shroud such as a three or four sided shroud). In such case, the tab portions would nonetheless operate to limit the movement of the member 16 in the longitudinal direction of the shroud 12 and keep the member 16 positioned in engagement with the spring arms 42, 44.

Many modifications and variations of the present invention are possible in light of the above teachings. It is, therefore, to be understood that within the scope of the appended claims, the invention may be practiced otherwise than as specifically described.

What is claimed is:

1. A method of attaching to a member a channel shaped heat shield assembly having a base with a pair of side walls extending therefrom to provide a channel extending along a longitudinal direction between opposite ends with at least one of said opposite ends being an open end, and a pair of spring arms, comprising:

attaching said heat shield assembly to the member by extending the member into said channel in a first direction transverse to the longitudinal direction of said heat shield assembly to engage said spring arms with the member against inadvertent removal in a reverse direction while the member is able to slide in a second direction relative to said spring arms along the longitudinal direction toward said at least one open end, wherein the second direction is transverse to the first direction; and providing a pair of retention tabs formed as bent portions of the base, said retention tabs being spaced from one another along the longitudinal direction of the base sufficiently to accommodate a portion of the member therebetween and projecting into said channel in position to capture the member against movement in the second direction along the longitudinal direction.

* * * * *